No. 795,774. PATENTED JULY 25, 1905.
T. D. JONES.
ORE TREATING AND FILTERING APPARATUS.
APPLICATION FILED NOV. 7, 1904.

4 SHEETS—SHEET 4.

Witnesses
Otto E. Hoddick
Dena Nelson.

Inventor
T. D. Jones.
by
Attorney

UNITED STATES PATENT OFFICE.

THEODORE D. JONES, OF DENVER, COLORADO.

ORE TREATING AND FILTERING APPARATUS.

No. 795,774.  Specification of Letters Patent.  Patented July 25, 1905.

Application filed November 7, 1904. Serial No. 231,664.

*To all whom it may concern:*

Be it known that I, THEODORE D. JONES, a citizen of the United States, residing in the city and county of Denver and State of Colorado, have invented certain new and useful Improvements in Ore Treating and Filtering Apparatus; and I do declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to an ore treating and filtering apparatus of the class adapted for use in the chlorination of ores and other like, similar, or analogous processes where the ore is first subjected to treatment in a closed vessel and the solution afterward drawn off from the vessel by filtration.

The apparatus will be described more especially with reference to its use in what is known as the "chlorination" process in which the ore is subjected to the treatment of chemicals in a cylindrical receptacle or barrel, whereby the precious-metal values are dissolved, the solution being afterward drawn off by filtration, the material in the barrel being subjected to pressure in a manner well understood.

In my improved apparatus I will for convenience refer to the closed vessel as a "barrel." In the apparatus I mount the barrel in a frame, the latter being trunnioned to rotate and the barrel being locked therein to rotate therewith during the process of chlorinating or otherwise treating the ore for the purpose of dissolving their metallic values. I employ adjustable means for locking the barrel in the trunnioned frame. After the ore treating or leaching process is complete the rotation of the frame is stopped, the barrel unlocked therefrom and tilted preparatory to filtration. In my improved apparatus the filter is located in one end of the barrel, and during the operation of filtration this end of the barrel is lowermost.

Having briefly outlined my improved construction as well as the function it is intended to perform, I will proceed to describe the same in detail, reference being made to the accompanying drawings, in which is illustrated an embodiment thereof.

Figure 1:
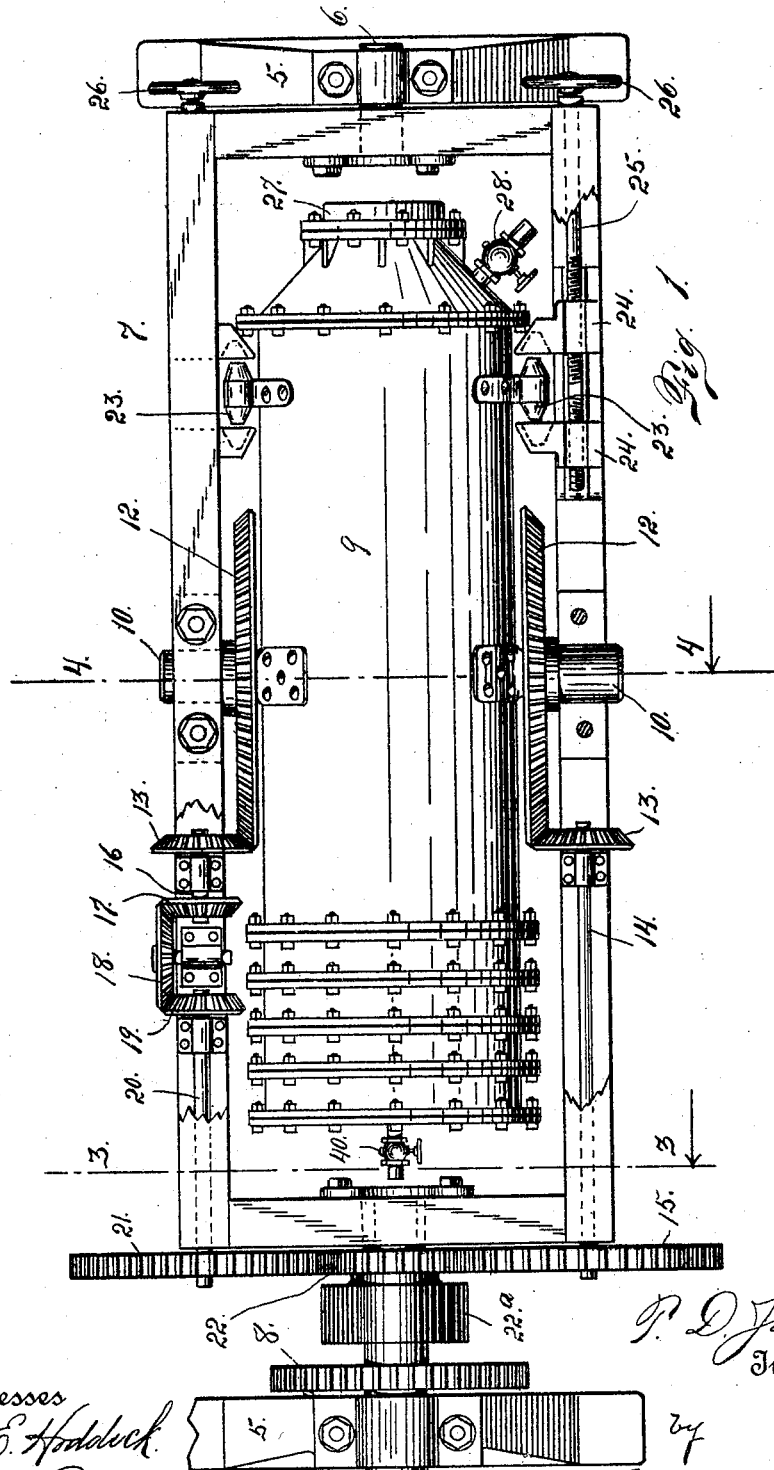
Figure 2:
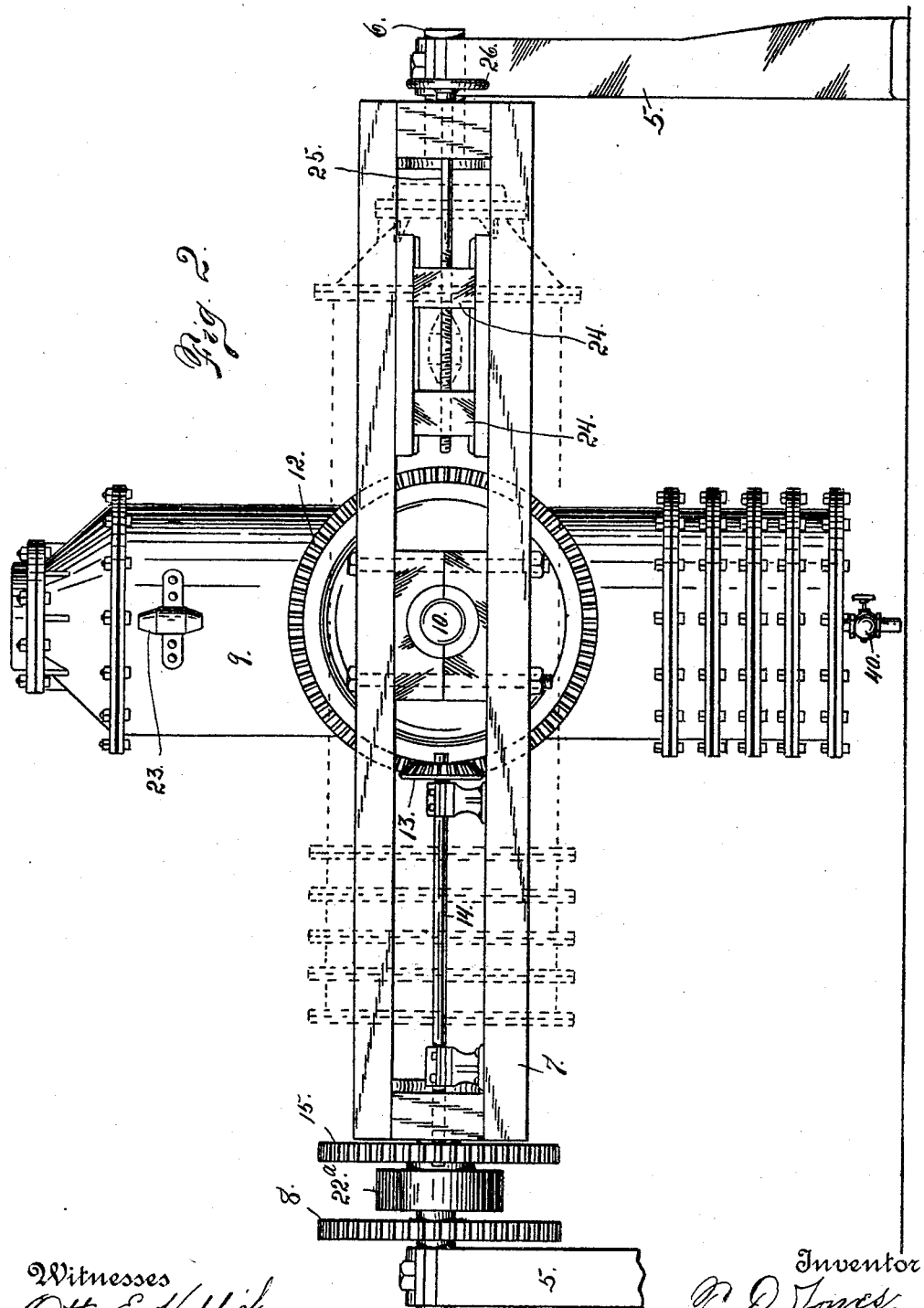
Figure 3:
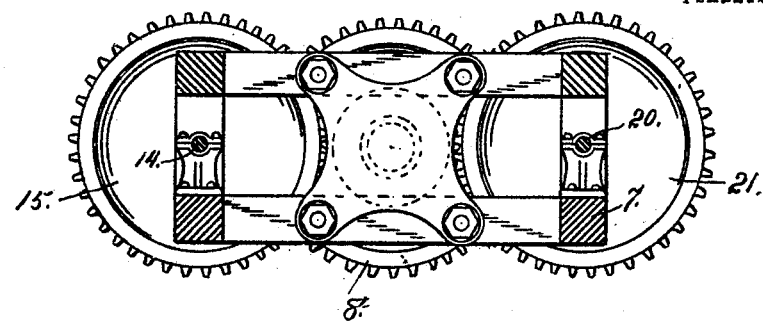
Figure 4:
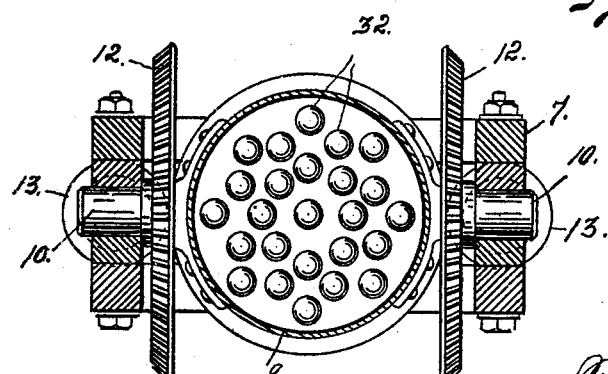
Figure 5:
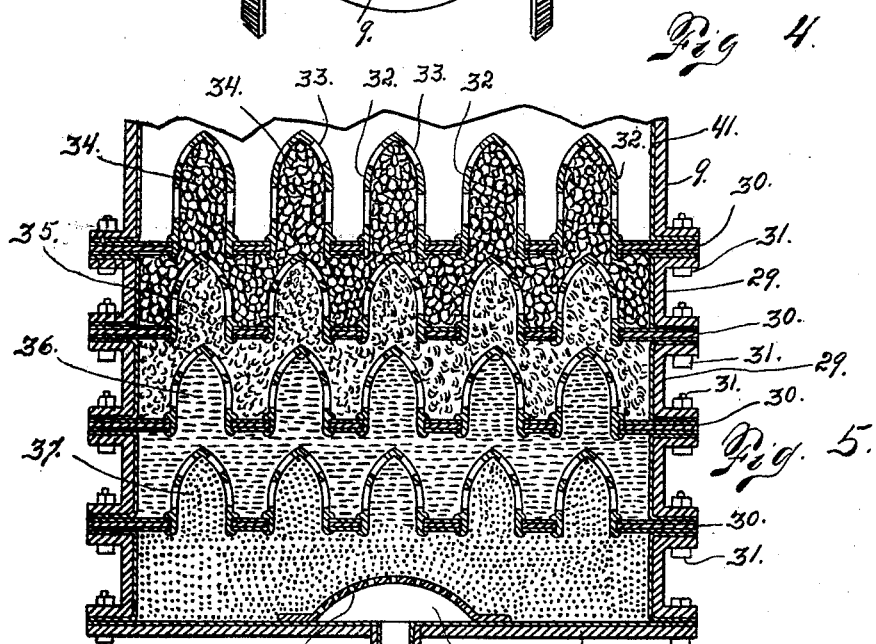
Figure 6:
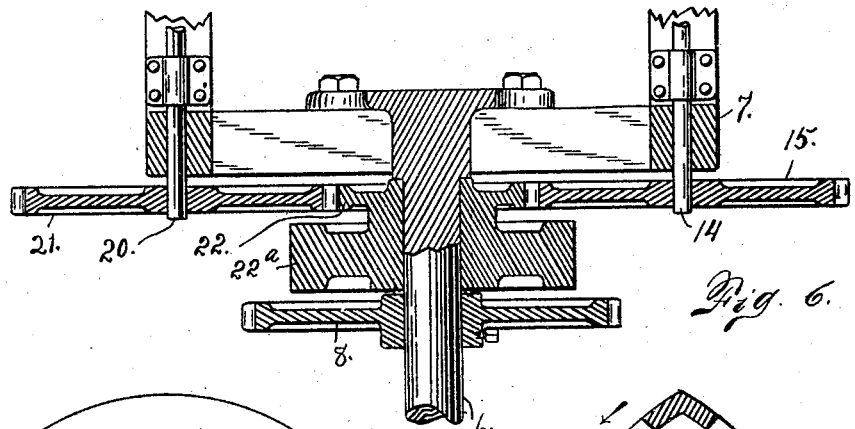
Figure 7:
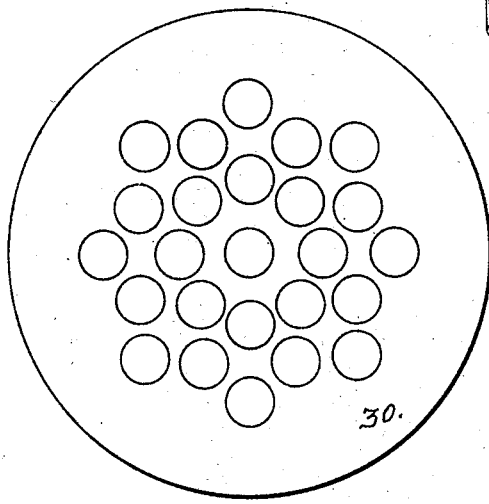
Figure 8:
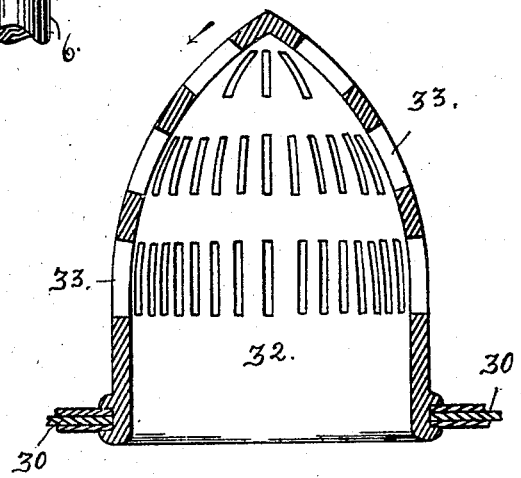
Figure 9:
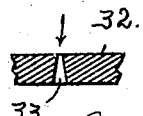
Figure 10:
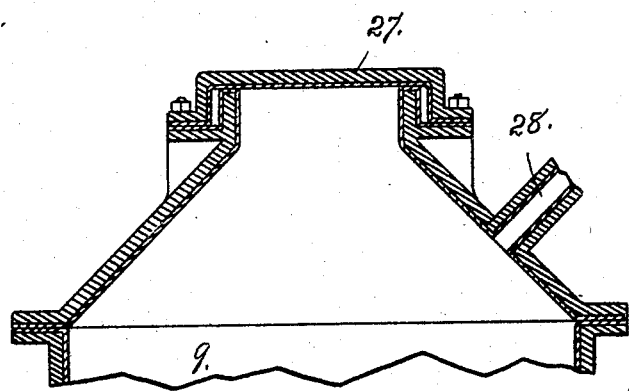

In the drawings, Figure 1 is a top or plan view of my improved apparatus. Fig. 2 is a side elevation of the same, showing the barrel in two positions, the horizontal position being in dotted lines and the vertical position in full lines. Figs. 3 and 4 are sections taken on the lines 3 3 and 4 4, respectively, of Fig. 1, viewed in the direction of the arrows. Fig. 5 is a fragmentary section of the barrel, taken through the extremity thereof containing the filter and on a larger scale. Fig. 6 is a horizontal section taken through the gearing at one extremity of the apparatus. Fig. 7 is a detail view of one of the plates 30 shown in Fig. 5 with the cells removed. Fig. 8 is a fragmentary sectional view of the plate 30 and its lead covering, showing one of the cells on a larger scale than in Fig. 5. Fig. 9 is a horizontal section taken through one of the openings 33 of a cell 32. Fig. 10 is a section taken through the extremity of the barrel 9 farther to the right in Fig. 1.

The same reference characters indicate the same parts in all the views.

Let the numeral 5 designate each of two upright supports, in which are journaled trunnions 6, made fast in a frame 7, which is rectangular in shape. The trunnions 6 at one end of the frame is produced and provided at its outer extremity with a gear-wheel 8, which may be connected with any suitable power for rotating the frame on its trunnions. Mounted in this frame is the barrel 9, which is provided with trunnions 10, journaled in the frame midway between its extremities. To each trunnion is attached a gear 12, meshing with a smaller gear 13. One gear 13 is fast on a shaft 14, journaled in one side of the frame and provided with a gear-wheel 15 at its outer extremity. The other gear 13 is fast on a short shaft 16, to which is also made fast a gear 17, meshing with a gear 18, the latter also meshing with a gear 19, fast on a shaft 20, to whose outer extremity is made fast a sprocket-wheel 21.

The two gears 15 and 21 are located on opposite sides of and mesh with a gear 22, loose on the frame-journal and formed integral with a friction-wheel 22$^a$. Power may be applied to this friction-wheel in any of the well-known ways for the purpose of tilting the barrel on its trunnions 10 either for the purpose of throwing it to the filtering position shown in Fig. 2 or for the purpose of inverting it when it is desired to discharge the gangue therefrom after filtration is complete, During the chlorination process or the process of treating the ores, whatever it may be, the barrel 9 must be locked in the frame, so that it will rotate therewith. As shown in the drawings, I have provided the barrel on opposite sides with brackets 23, whose extremities are adapted to enter sockets formed in devices 24, mounted on shafts 25, carrying right and left threads which the parts 24 engage. These shafts are journaled in the opposite sides of the frame and provided at their outer extremities with hand-wheels 26. By turning these shafts in one direction the parts 24 may be moved to engage the brackets 23, whereby the barrel is locked in the frame and caused to rotate therewith. When it is desired to move the barrel on its trunnions 10 or independently of the frame, the shafts are turned to unlock the barrel.

The barrel is provided at one extremity with a removable head 27. The head extremity of the barrel is also provided with a valve-controlled inlet 28. Within the extremity of the barrel opposite the removable head is placed the filter, which is best illustrated in Fig. 5 and which consists of a number of flanged sections 29 and lead-covered plates 30, to which the sections are secured by means of bolts 31. The plates 30 are provided with openings in which are inserted cells 32, which are perforated, as shown at 33, and filled with filtering material 34, 35, 36, and 37. As shown in the drawings, the filtering material 34 is coarsest, while the material 35 is next coarser, and so on, the material 37 being finest. When the barrel is in the vertical position for filtration, the material 34 is uppermost and the solution passes therethrough first. It must be understood, however, that I do not limit the invention to this particular arrangement of the filtering material. Neither do I limit the invention to any special construction of filter, since it is believed that the scope of the invention is sufficiently broad to cover a suitable filter placed in one end of a barrel arranged to rotate on a longitudinal axis during the ore-treating process. Attention is called to the fact that the filtering material 34 not only fills the cells 32, but also fills the space between the cells immediately below, while the filtering material 35 not only fills the cells next below the cells 32, but also fills the space surrounding the layer of cells provided with filtering material 36, and so on. In the central portion of the bottom of the barrel is located a perforated plate 38, concavo-convex in shape and having its convex surface uppermost. Between this plate and the end of the barrel is a smaller chamber 39, communicating with a valve-controlled outlet 40, through which the filtered solution or liquor passes as it is drawn from the barrel. Attention is called to the fact that this barrel is preferably lined with lead 41, as this material is not attacked by the chlorin or other chemicals generally employed in the treatment of ores for the purpose heretofore stated. It is for this reason that the cells 32 are composed of lead and also for this reason that the plates 30 are preferably covered with lead on both sides, since it is not practicable to expose cast-iron or steel plates to the action of the chlorin and other chemicals. It is well known that these chemicals attack iron and quickly destroy it. Hence some provision must be made for its protection. The lead covering is satisfactory.

While placing the filtering material in the barrel all of the filter-sections 29 are removed, leaving only the uppermost plate 30, with its cells in place. The necessary filtering material is then placed in the cells. The next section 29 is then placed in position and after this the next plate 30, and so on, the plates and sections being placed in position and the filtering material placed within and around them until the entire filter is in place, after which the end plate or head 42 of the barrel is secured in place.

From the foregoing description the use and operation of my improved apparatus will be readily understood. The ore charge will be placed in the barrel when it is in the upright position or that shown in Fig. 2, the detachable head being removed. Assuming that the ore charge, together with the chemicals, are in place, the barrel is thrown to the position shown in Fig. 1, whereby its longitudinal axis occupies a horizontal position. It is then locked to the frame 7 by the adjustment of the screw-shafts 5. The barrel is then rotated on its longitudinal axis with the frame 7, which turns on its trunnions 6 within the upright supports 5 until the chlorination or other treatment of the ores is complete. After this is accomplished the rotation of the frame ceases and the barrel is unlocked therefrom by the use of the screw-shafts 25. Power is then applied to the friction-wheel $22^a$, whereby the barrel is tilted to the upright position or that shown in Fig. 2 through the instrumentality of the gearing connection, as heretofore explained. Pressure is then applied to the contents of the barrel through the instrumentality of the inlet 28, whereby the solution is forced through the filter and discharged from the barrel through the valve-controlled outlet 40. After the filtration is complete the detachable head 27 is removed and the barrel inverted, whereby the pulp or gangue is discharged therefrom preparatory to the treatment of the next charge of ore, as will be readily understood.

In the construction of filter shown in Fig. 5 of the drawings the filtering material 34 may be considered coarse gravel, the material 35 finer gravel, the material 36 still finer material of any suitable kind, and the material 37 sand. It is evident, however, that any desired substance may be employed for this purpose.

Having thus described my invention, what I claim is—

1. In a combined ore treating and filtering apparatus, the combination of a frame trunnioned at its extremities to rotate, a barrel mounted in the frame to rotate therewith on its longitudinal axis and trunnioned in the frame to rotate independently of the latter on an axis extending at right angles to its longitudinal axis.

2. The combination of a frame journaled at its extremities, a barrel trunnioned in the sides of the frame, means for locking the barrel in the frame to prevent the barrel from rotating on its trunnions independently of the frame, and means for rotating the frame and barrel on the longitudinal axis of the latter.

3. A combined ore treating and filtering apparatus comprising a receptacle mounted to rotate on its longitudinal and transverse axes and having a filter located in one end of the barrel.

4. A combined ore treating and filtering apparatus, comprising a frame journaled at its extremities, means for rotating the frame on its journals, a barrel trunnioned in the sides of the frame, means for locking the barrel in the frame to prevent the barrel from rotating on its trunnions independently of the frame, the barrel being provided at one extremity with a filter and at its opposite extremity with a valve-controlled inlet for subjecting the contents of the barrel to pressure, the filter extremity of the barrel being also provided with a valve-controlled outlet for the escape of the filtered liquid.

5. A combined ore treating and filtering apparatus comprising a receptacle mounted to rotate on its longitudinal and transverse axes and having a filter located at one end only of the receptacle.

6. The combination of a trunnioned frame, a barrel trunnioned in the frame on an axis at right angles to the frame-trunnions, and means for locking the barrel on the frame with the longitudinal axis of the barrel in alinement with the frame-trunnions.

7. The combination of a frame trunnioned to rotate on its longitudinal axis, a barrel trunnioned in the frame to rotate on an axis at right angles to the frame-trunnions, means for locking the barrel to rotate with the frame and with the longitudinal axis of the barrel in line with the frame-trunnions, the barrel being provided with brackets on opposite sides, shafts provided with right and left threads journaled in the frame, and devices mounted on the shafts for engaging the brackets of the barrel whereby the latter may be locked in position on the frame, substantially as described.

8. In an apparatus of the class described, the combination of a barrel or cylinder mounted to rotate on its longitudinal axis and provided at one extremity with a number of transversely-located lead-covered plates and flanged detachable sections connected with the body of the barrel and with the said plates, the said plates being provided with openings in which are inserted perforated cells filled and surrounded by filtering material, the filter extremity of the plate being provided with a valve-controlled outlet through which the filtered solution may be drawn off.

9. A filter-barrel mounted to rotate on its longitudinal axis and provided at one extremity with a flanged detachable section suitably connected with the body of the barrel which is flanged for the purpose, a lead-covered plate secured to the barrel between the flanges of the barrel and the flanges of the section, and perforated cells inserted in the plate and filled with filtering material, the filter extremity of the barrel being provided wth a head to which is attached a valved outlet for the filtered liquid, substantially as described.

10. A barrel provided with a filter at one extremity composed of a number of perforated cells containing filtering material, and a filling of filtering material between the said filtering-cells, the said material being coarsest adjacent the body of the barrel and increasing in fineness toward the filter extremity thereof.

11. A combined ore treating and filtering apparatus comprising a receptacle mounted to rotate on its longitudinal and transverse axes, and provided with a filter.

In testimony whereof I affix my signature in presence of two witnesses.

THEODORE D. JONES.

Witnesses:
　A. J. O'BRIEN,
　DENA NELSON.